Feb. 8, 1949.   D. CANADY   2,461,033
WEIGHT CONTROLLED REEL DRIVE
Filed Sept. 19, 1946
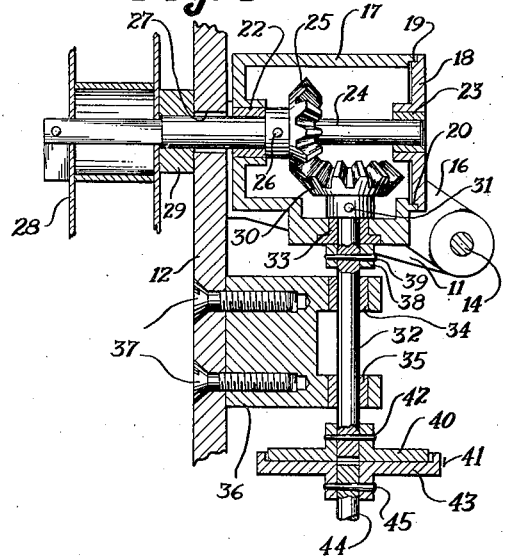
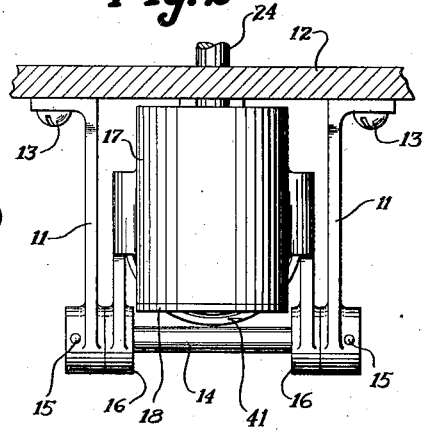
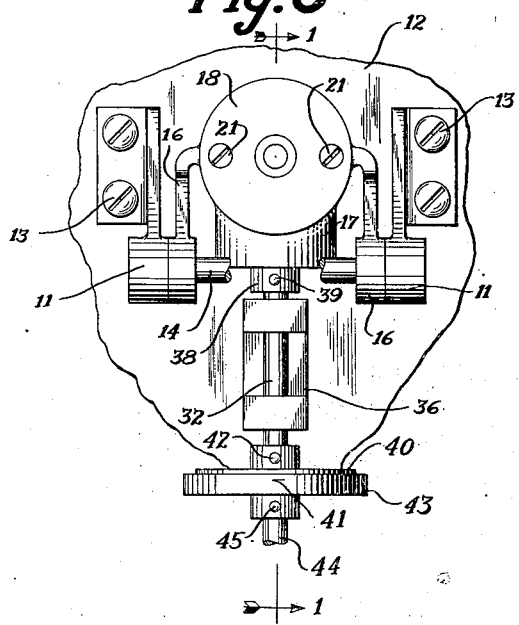
INVENTOR.
Don Canady.
BY H.C. Karel
Attorney Patented Feb. 8, 1949

2,461,033

UNITED STATES PATENT OFFICE 2,461,033

WEIGHT CONTROLLED REEL DRIVE

Don Canady, Cincinnati, Ohio, assignor to Dayton Acme Company, Cincinnati, Ohio, a corporation of Ohio Application September 19, 1946, Serial No. 698,073

3 Claims. (Cl. 242—55)

This invention relates to a weight controlled reel drive, primarily useful in connection with a motion picture projector to increase the friction on the driving clutch as the film on the take-up reel increases.

The object of my invention is to provide a friction clutch driving mechanism for a winding reel, whereby as the material on the reel increases, the added weight will increase the tension on the clutch.

A further object is to provide a pivotally mounted housing supporting a gear driven cross-shaft arranged to carry a winding reel, whereby the combined weight of the housing and reel will exert a pressure on the driving clutch.

My invention will be further readily understood from the following description and claims, and from the drawings, in which latter;

Fig. 1 is a vertical section of the mechanism, taken in the plane of the line 1—1 of Fig. 3.

Fig. 2 is a plan view of the same.

Fig. 3 is a front view of the same.

My invention comprises a pair of arms 11 rigidly mounted on the frame 12 as by screws 13. A shaft 14 extends through the extended ends of said supports and is retained therein by pins 15. Arms 16 extending from the housing 17 are pivoted on the shaft 14. A cover 18 is secured to the housing by means of a rabbet 19 received in a recess 20 in the housing and secured in place by screws 21. Bearings 22 and 23 in the housing and cover support a cross-shaft 24 to which a bevel gear 25 is secured by a pin 26. The shaft extends through an aperture 27 of sufficient size to permit up and down movement of the shaft. A winding reel 28 is suitably held on the shaft 24 being spaced from the frame by a collar 29. A bevel gear 30 is secured by means of a pin 31 to a vertical shaft 32 mounted in bearing 33 in the housing and bearings 34 and 35 in a block 36 which is secured to the frame 12 by screws 37. A collar 38 secured to the shaft by a pin 39 retains the shaft in relation to the housing. Mounted on the lower end of the shaft 32 is the driven member 40 of the clutch unit 41. This member is attached to the shaft by a pin 42. The driving member 43 of the clutch is secured to a shaft 44 by a pin 45. The shaft 44 is driven from any suitable source of power preferably mounted on the frame 12.

In the operation of the device the shaft 44 is held against endwise movement and the normal weight of the gear box is sufficient to maintain a friction drive between the clutch members. As the material being wound on the reel increases the added weight will increase the friction between the clutch members.

Having thus fully described my invention, what I claim as new and desire to secure by Letters Patent, is:

1. A weight controlled reel drive comprising a frame, a driving member, a driven member, clutch faces between said members, a shaft extending from said driven member, a housing supported on said shaft, a pair of arms extending from said frame, a second pair of arms secured to said housing and having pivoted connection with said frame arms, a cross-shaft in said housing having geared connection with said first named shaft, and a reel on said cross-shaft.

2. A weight controlled reel drive comprising a frame, a driving member, a driven member, clutch faces between said members, a shaft extending from said driven member, bearings extending from said frame for supporting said shaft, a housing supported on said shaft, a pair of arms extending from said frame, a second pair of arms secured to said housing and having pivoted connection with said frame arms, a cross-shaft in said housing having geared connection with said first named shaft, and a reel on said cross-shaft.

3. A weight controlled reel drive comprising a frame, a driving member, a driven member, clutch faces between said members, a vertical shaft extending from said driven member, bearings extending from said frame for supporting said shaft, a housing supported on said shaft, a pair of arms extending from said frame, a second pair of arms secured to said housing and having pivoted connection with said frame arms, a cross-shaft in said housing having geared connection with said first named shaft, and a reel on said cross-shaft.

DON CANADY.

REFERENCES CITED

The following references are of record in the file of this patent:

UNITED STATES PATENTS

| Number | Name | Date |
|---|---|---|
| 1,857,780 | Frappier et al. | May 10, 1932 |
| 2,124,938 | Wittel | July 26, 1938 |